US012215273B2

(12) United States Patent
Deville et al.

(10) Patent No.: US 12,215,273 B2
(45) Date of Patent: Feb. 4, 2025

(54) HIGH DENSITY BRINE INTERNAL PHASE

(71) Applicant: Halliburton Energy Services, Inc., Houston, TX (US)

(72) Inventors: Jay Paul Deville, Spring, TX (US); Hui Zhou, The Woodlands, TX (US); Chesnee Lae Davis, Spring, TX (US); Catherine Martin Santos, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/131,329

(22) Filed: Apr. 5, 2023

(65) Prior Publication Data

US 2023/0242803 A1 Aug. 3, 2023

Related U.S. Application Data

(62) Division of application No. 16/961,892, filed as application No. PCT/US2018/067711 on Dec. 27, 2018, now Pat. No. 11,649,391.

(Continued)

(51) Int. Cl.
*C09K 8/36* (2006.01)
*E21B 21/00* (2006.01)

(52) U.S. Cl.
CPC .............. *C09K 8/36* (2013.01); *E21B 21/00* (2013.01)

(58) Field of Classification Search
CPC ... C09K 8/03; C09K 8/32; C09K 8/34; C09K 8/36; C09K 8/40; C09K 8/424; C09K 2208/00; E21B 21/00

(Continued)

(56) References Cited

U.S. PATENT DOCUMENTS 5,643,858 A 7/1997 Woolley
6,635,604 B1 * 10/2003 Halliday ................. C09K 8/06
507/131

(Continued)

FOREIGN PATENT DOCUMENTS

WO 0159256 8/2001
WO 02081590 10/2002

(Continued)

OTHER PUBLICATIONS

ISRWO International Search Report and Written opinion for PCT/US2018/067711 dated Apr. 16, 2019.

(Continued)

*Primary Examiner* — Angela M DiTrani Leff
(74) *Attorney, Agent, or Firm* — Thomas Rooney; C. Tumey Law Group PLLC

(57) ABSTRACT

An oil-based treatment fluid for use in subterranean operations may comprise an invert emulsion including an aqueous internal phase and an oil external phase. The aqueous internal phase is solids free and comprises a two-salt brine and a true crystallization temperature reduction additive. The two-salt brine comprises a bromide and a nitrate, wherein the bromide brine has a density of about 14.2 lbs/gal to about 17 lbs/gal. There are no additional salts in the aqueous internal phase; The bromide brine has a first true crystallization temperature without inclusion of a true crystallization temperature reduction additive and a second true crystallization temperature with a true crystallization temperature reduction additive that is lower than the first true crystallization temperature reduction additive.

20 Claims, 2 Drawing Sheets

Related U.S. Application Data

(60) Provisional application No. 62/646,794, filed on Mar. 22, 2018.

(58) Field of Classification Search
USPC ..................................................... 175/65, 72
See application file for complete search history.

(56) References Cited

U.S. PATENT DOCUMENTS

| | | | |
|---|---|---|---|
| 10,913,884 B2 | 2/2021 | Mack et al. | |
| 2005/0250652 A1* | 11/2005 | Taylor | C09K 8/36 507/203 |
| 2006/0272815 A1 | 12/2006 | Jones et al. | |
| 2008/0135302 A1 | 6/2008 | Zhang et al. | |
| 2009/0203554 A1* | 8/2009 | Monroe | C09K 8/514 507/216 |
| 2014/0087976 A1 | 5/2014 | Wagle et al. | |
| 2017/0073566 A1 | 3/2017 | Pober | |
| 2017/0145284 A1* | 5/2017 | Davidson | C04B 22/085 |
| 2017/0233630 A1 | 8/2017 | Nalepa et al. | |
| 2017/0292055 A1 | 10/2017 | Alleman | |
| 2018/0016484 A1* | 1/2018 | Ray | C09K 8/68 |
| 2018/0215986 A1* | 8/2018 | Mack | C09K 8/03 |

FOREIGN PATENT DOCUMENTS

| | | |
|---|---|---|
| WO | 2016196332 | 12/2016 |
| WO | 2017116611 | 7/2017 |
| WO | 2017165754 | 9/2017 |
| WO | 2018013949 | 1/2018 |
| WO | 2019148151 | 8/2019 |

OTHER PUBLICATIONS

Office Action Summary for U.S. Appl. No. 16/961,892 dated Oct. 15, 2021.
Final Office Action Summary for U.S. Appl. No. 16/961,892 dated Feb. 8, 2022.
Office Action Summary for U.S. Appl. No. 16/961,892 dated Jun. 9, 2022.
Final Office Action Summary for U.S. Appl. No. 16/961,892 dated Aug. 26, 2022.
Office Action Summary for U.S. Appl. No. 16/961,892 dated Nov. 1, 2022.
Notice of Allowance for U.S. Appl. No. 16/961,892 dated Mar. 7, 2023.

* cited by examiner

HIGH DENSITY BRINE INTERNAL PHASE

CROSS-REFERENCE TO RELATED APPLICATIONS

The present application is a divisional of U.S. patent application Ser. No. 16/961,892, filed on Jul. 13, 2020, which is a national stage under 35 U.S.C. 371 of PCT Application No. PCT/US2018/067711, filed Dec. 27, 2018, the entire disclosures of which are incorporated herein by reference, which claims benefit of U.S. provisional patent application Ser. No. 62/646,794, filed on Mar. 22, 2018.

BACKGROUND

Brines may be used in subterranean operations for a number functions. By way of example, treatment fluids used in drilling, completion, or workover operations may include a brine. Examples of suitable treatment fluids may include, but are not limited to, drilling fluids, packer fluids, displacement fluids, completion fluids, gravel pack fluids, and work over fluids. In some instances, these treatment fluids may be an oil-based fluid in the form of an invert emulsion that includes an oil external phase and an aqueous internal phase. The aqueous internal phase may include a brine, for example, to provide a desired density for the treatment fluids.

In some instances, the use of brines with higher densities may be problematic. To provide a higher density to the treatment fluid, an aqueous internal phase of an appropriate density may be needed. Currently, calcium bromide can be used in the aqueous internal phase, but it can be challenging to achieve densities for the aqueous internal phase of greater than 14.2 lbs/gal (1,700 kg/m$^3$) without precipitation of the salt. The pressurized crystallization temperature (PCT) is the point where solids form in brine solutions under pressure. The effects of pressure can be significant in deep water applications and cold climates where the brines may crystallize at a temperature higher than the expected True Crystallization Temperature (TCT). Some negative effects due to crystallization may include, at very low temperatures, plugging of choke lines and kill lines. Additionally, at low temperatures, valves may seize. The removal of deposited crystals during pressure testing in locations of the wellbore where circulation may be poor may be extremely difficult and costly. Also, if crystals form at the surface, the density of the resulting brine may be lowered, this may present difficulties in controlling the pressure downhole. Accordingly, due to these crystallization concerns with calcium bromide, cesium formate is often used where high densities are needed. However, the high cost associated with cesium formate often precludes its use.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
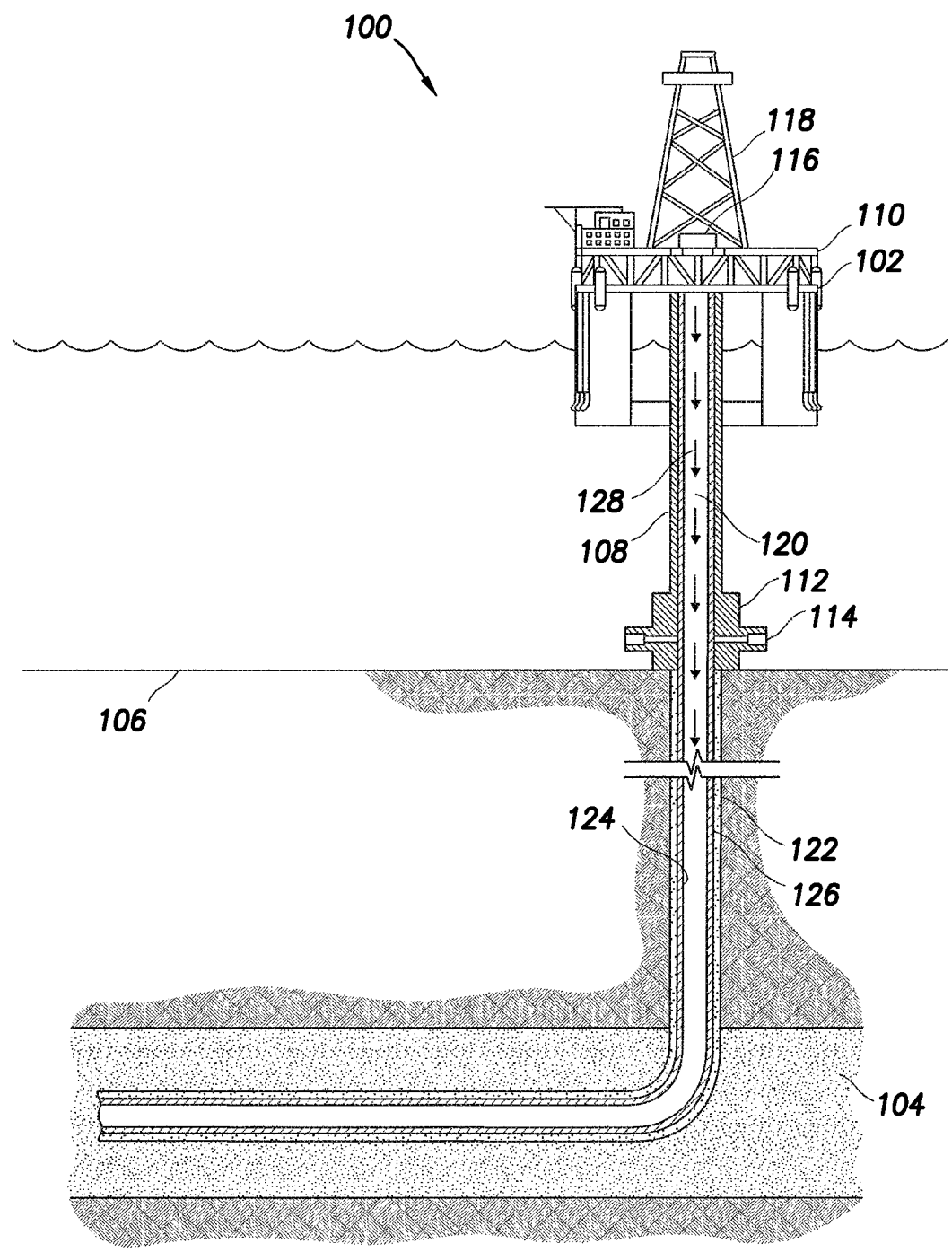
FIG. 1 illustrates placement of an oil-based treatment fluid into a wellbore in a subterranean operation, wherein the oil-based treatment fluid includes a true crystallization temperature reduction additive in the aqueous internal phase.

Provided are compositions and methods for a well treatment and, more particularly, to oil-based treatment fluids that use a true crystallization temperature reduction additive in the aqueous internal phase. Advantageously, the true crystallization temperature reduction additive may reduce the true crystallization temperature of a bromide brine in the aqueous internal phase, thus enabling the use of higher density bromide brines than can be used without the true crystallization temperature reduction additive. Among other things, the high density brines that may be used are free or essentially free of zinc and cesium formate. The bromide brines may be considered essentially free of zinc and cesium formate if the brine includes zinc and cesium formate in an amount of about 1 wt. % based on the total weight of the brine or less.

Suitable oil-based treatment fluids may be in the form of an invert emulsion including an aqueous internal phase and an oil external phase. The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof.

Those of ordinary skill in the art will appreciate that the oil-based treatment fluid generally should have a density suitable for a particular application. By way of example, the oil-based treatment fluid may have a density in the range of from about 7 pounds per gallon ("lb/gal") (840 kg/m$^3$) to about 20 lb/gal (2400 kg/m$^3$). In certain embodiments, the oil-based treatment fluids may have a density in the range of from about 8 lb/gal (960 kg/m$^3$) to about 12 lb/gal (1440 kg/m$^3$) or from about 12 lb/gal (1440 kg/m$^3$) to about 18 lb/gal 2160 kg/m$^3$) or from about 10 lb/gal (1200 kg/m$^3$) to about 14 lb/gal (1680 kg/m$^3$). Those of ordinary skill in the art, with the benefit of this disclosure, will recognize the appropriate density for a particular application. In some embodiments, the treatment fluid may be considered low solids or solids free. This may be particularly desirable, for example, where the oil-based treatment fluid may be used, for example, in completion applications or in a reservoir section of a wellbore (e.g., drill-in fluid). By using these low solids or solids free treatment fluids, formation damage may be minimized, in some instances. As used herein the term "solids free" means that a fluid (e.g., the oil-based treatment fluid) is free of intentionally added solids or, to the extent that intentionally added solids are present, the solids are present in an amount of less than 100 parts per million. It should be understood that minor amounts of solids may unintentionally be added to the fluid during use in a wellbore.

A suitable aqueous internal phase may include a bromide brine. Suitable bromide brines may be saturated or unsaturated as desired for a particular application. One or more salts may be added to water to provide a bromide brine that may include dissolved salt and water. Suitable dissolved salts may include any of a variety of bromide salts, including, but not limited to, lithium bromide, sodium bromide, potassium bromide, rubidium bromide, magnesium bromide, calcium bromide, strontium bromide, zinc bromide, manganese (II) bromide, or any combinations thereof. In a non-limiting example, one salt may be used to prepare the brine. In some embodiments, multiple bromide salts may be used to prepare the bromide brine such that the bromide brine may be considered a single bromide brine, for example, including no additional salt or, if present, no more than about 1 wt. % based on the total weight of the bromide brine. In some examples, the brine may be free or essentially free of zinc and cesium formate.

The bromide brine may be considered "high density." As used herein, the term "high density" refers to a brine with a density of about 14.2 lbs/gal (1,700 kg/m$^3$) or greater. Suitable brines may have a density of about 14.2 lbs/gal (1,700 kg/m$^3$) to about 17 lbs/gal (2,040 kg/m$^3$), or a density of about 14.2 lbs/gal (1,700 kg/m$^3$) to about 16 lbs/gal (1,920 kg/m$^3$), or a density of about 15 lbs/gal (1,800 kg/m$^3$) to about 16 lbs/gal (1,920 kg/m$^3$). By way of example, the brine may have a density of about 14.2 lbs/gal, (1,700 kg/m$^3$), 14.5 lbs/gal (1,740 kg/m$^3$), 15 lbs/gal (1,800 kg/m$^3$), 16 lbs/gal (1,920 kg/m$^3$), 16.5 lbs/gal (1,980 kg/m$^3$), or 17 lbs/gal (2,040 kg/m$^3$).

The bromide brine may be considered "solids free." As used herein the term "solids free" means that a fluid (e.g., the bromide brine) is free of intentionally added solids or, to the extent that intentionally added solids are present, the intentionally added solids are present in an amount of less than 100 parts per million. In some embodiments, an oil-based treatment fluid formulated with the bromide brine may be solids free.

Without limitation, the bromide brine may be present in the aqueous internal phase in any suitable amount, including but not limited to, 80 wt. % to 100 wt. % based on a total weight of the aqueous internal phase. One or ordinary skill in the art, with the benefit of this disclosure, should be able to select an appropriate amount of the bromide brine for a particular application.

As previously described, a true crystallization temperature reduction additive may be included in the bromide brine. The true crystallization temperature reduction additive may disrupt the formation of a crystal structure in the bromide brines. Additionally, the true crystallization temperature reduction additive may be capable of enabling a bromide brine with a higher density in a liquid state than can be achieved for the same bromide brine without the true crystallization temperature reduction additive. Any suitable true crystallization temperature reduction additive capable of lowering the crystallization temperature of treatment fluid may be used. In a non-limiting example, suitable crystallization temperature reduction additives may include nitrates, such as magnesium nitrate, calcium nitrate, ammonium nitrate, glycols, polyols, sugar alcohols, sugar acids, aldoses, ketoses, malonamide, the like, and/or any combinations thereof. The true crystallization temperature reduction additive may be added to the bromide brine in any suitable amount. Suitable amounts may include, but are not limited to, an amount of about 1 wt. % to about 70 wt. % based on a total weight of the aqueous internal phase. Optionally, the crystallization temperature reduction additive may be added to the oil-based treatment fluid in an amount of about 5 wt. % to about 50 wt. % based on a total weight of the aqueous internal phase, or, alternatively, about 10 wt. % to about 40 wt. % based on a total weight of the aqueous internal phase, or alternatively, ranging about 1 wt. % to about 20 wt. % based on a total weight of the aqueous internal phase. For example, the true crystallization temperature reduction additive may be included in the bromide brine in an amount of about 1 wt. %, about 5 wt. %, about 10 wt. %, about 20 wt. %, about 30 wt. %, about 40 wt. %, about 50 wt. %, about 60 wt. %, or about 70 wt. % based on a total weight of the aqueous internal phase.

The bromide brine may have a true crystallization temperature. The crystallization temperature is the temperature at which crystallized solids begin to form in a fluid that includes dissolved salts. In particular, the true crystallization temperature refers to the temperature corresponding to the maximum temperature reached following the super-cooling minimum, as determined using the methods described in the 5$^{th}$ edition of the API Standards published in October 2014, under API RP 13J.

By inclusion of the true crystallization temperature additive in the bromide brine, the true crystallization temperature of the bromide brine may be reduced. An example method of preparing an oil-based treatment fluid may include providing a bromide brine. The bromide brine may be obtained or prepared by dissolution of a bromide salt in water. The bromide brine may have a first true crystallization temperature. The bromide brine may have a density of about 14.2 lbs/gal (1,700 kg/m$^3$) or greater. A true crystallization temperature reduction additive, as previously described, may then be added to the bromide brine to form an aqueous composition having a second true crystallization temperature. The true crystallization temperature reduction additive may be added to the bromide brine in any suitable manner, including but not limited to, adding the bromide brine and the true crystallization temperature reduction additive to a mixer. Any suitable mixer may be used. In some embodiments, the true crystallization temperature reduction additive may be added to a mixing tank by way of a mixing hopper. The true crystallization temperature reduction additive may be added in bulk and/or in small packages. By addition of the true crystallization temperature reduction additive, the second true crystallization temperature may be less than the first true crystallization temperature. By way of example, the second temperature true crystallization temperature may be less than the first temperature true crystallization temperature by about 5° F. (3° C.), about 10° F. (6° C.), or even more. In one example, the second temperature true crystallization temperature may be less than the first temperature true crystallization temperature by about 55° F. (30° C.). The reduction in the true crystallization temperature by addition of the crystallization temperature reduction additive may depend on a number of factors, including, but not limited to, the type of bromide brine and true crystallization temperature reduction additive, as well as concentration of the true crystallization temperature reduction additive. If desired, additional salt may be added to the aqueous composition, after addition of the true crystallization temperature additive, such that the aqueous composition has an increased density as compared to the bromide brine. For example, salt may be added to increase the density by 5%, 10%, 20%, or even more. In some embodiments, an invert emulsion may then be prepared by combining the aqueous composition with a base oil, thereby forming an oil-based treatment fluid including an aqueous internal phase and an oil external phase.

Increasing the density and lowering the true crystallization temperature of the bromide brine may provide many benefits for different applications downhole. For example, an oil-based treatment fluid may be prepared with a higher density, but the same ratio of oil external phase to aqueous internal phase as for the same oil-base treatment fluid without the true crystallization temperature reduction additive. By way of further example, an oil-based treatment fluid may be prepared with the same density, but less aqueous internal phase, thus reducing the amount of the bromide brine potentially improving the rheological profile of the resultant oil-based treatment fluid.

In some embodiments, the bromide brine may further include a glycol or a polyol. A glycol or a polyol may be added to the bromide brine to further reduce the true crystallization temperature of the bromide brine. Any suitable glycol and polyol may be added, including, but not limited to, ethylene glycol, diethylene glycol, triethylene glycol, propylene glycol, butylene glycol, polyethylene glycol, polypropylene glycol, polyethylene-polypropylene glycol, glycerol, polyglycerol, trimethylolpropane, trimethylolethane, pentaerythritol, sugar alcohols, sugar acids, and combinations thereof. Glycol or polyol may be present in the oil-based treatment fluid in any suitable amount, including but not limited to, about 0.5 wt. % to about 50 wt. %, or about 1 wt. % to about 40 wt. %, or about 5 wt. % to about 30 wt. % based on a total weight of the oil-based treatment fluid.

The aqueous internal phase may be present in the oil-based fluid in any suitable amount, including but not limited to, an amount of about 1 wt. % to about 90 wt. %, about 1 wt. % to about 5 wt. %, about 5 wt. % to about 10 wt. %, about 10 wt. % to about 15 wt. %, about 15 wt. % to about 20 wt. %, about 20 wt. % to about 25 wt. %, about 25 wt. % to about 30 wt. %, about 3 wt. % to about 35 wt. %, about 35 wt. % to about 40 wt. %, about 40 wt. % to about 45 wt. %, about 45 wt. % to about 50 wt. %, about 10 wt. % to about 30 wt. %, or about 30 wt. % to about 80 wt. % based on a total weight of oil-based treatment fluid. With the benefit of this disclosure one of ordinary skill in the art should recognize the appropriate amount of the aqueous internal phase for a chosen application.

The oil-based treatment fluid may further include an oil external phase that includes a base oil. Any suitable base oil may be used. It should be noted that the term "oil," as used herein, is not limited to a viscous liquid derived from petroleum. The term "oil," as used herein, may also refer to organic oils, synthetic oils, oils derived from petroleum products, mineral oils, the like, and/or any combination thereof. In an embodiment, suitable base oils may include, but are not limited to, light mineral oil, diesel oil, a glycol ether solvent, a hydrotreated light petroleum distillate having about 9 to 16 carbon atoms, ethylene glycol monobutyl ether, diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, the like, and/or any combination thereof. In some embodiments, the base oil may be diesel oil. Base oil may be present in the oil external phase in any suitable amount, including an amount of about 80 wt. % to about 100 wt. % based on a total weight of the oil external phase. One or ordinary skill in the art, with the benefit of this disclose, should be able to select an appropriate base oil and amount thereof for a particular application.

The oil external phase may be present in the oil-based fluid treatment in any suitable amount, including but not limited to, an amount of about 10 wt. % to about 99 wt. %, about 1 wt. % to about 5 wt. %, about 5 wt. % to about 10 wt. %, about 10 wt. % to about 15 wt. %, about 15 wt. % to about 20 wt. %, about 20 wt. % to about 25 wt. %, about 25 wt. % to about 30 wt. %, about 3 wt. % to about 35 wt. %, about 35 wt. % to about 40 wt. %, about 40 wt. % to about 45 wt. %, about 45 wt. % to about 50 wt. %, about 10 wt. % to about 30 wt. %, about 10 wt. % to about 40 wt. %, or about 20 wt. % to about 70 wt. % based on a total weight of oil-based treatment fluid. One or ordinary skill in the art, with the benefit of this disclose, should be able to select an appropriate amount of the oil external phase for a particular application.

Embodiments of the oil-based treatments fluids may have any suitable oil external phase to aqueous internal phase ratio. In some embodiments, the oil-based treatments fluids may have an oil external phase to aqueous internal phase ratio of about 10:90 to about 99:1, or alternatively, about 40:60 to about 70:30, or alternatively, about 50:50 to about 60:40. For example, the oil-based treatments fluids may have an oil external phase to aqueous internal phase ratio of about 30:70, about 40:60, about 50:50, about 60:40, about 70:30, or about 80:20. Advantageously, by inclusion of true temperature reduction additive, oil-based treatment fluids may be prepared with increased density without changing the oil external phase to aqueous internal phase ratio. Additionally, oil-based treatments may be prepared of the same density with a reduction in the amount of water due to use of a bromide of increase density, which may provide improved rheological properties.

The oil-base treatment fluid may further include an emulsifying surfactant. Any suitable emulsifying surfactant for emulsifying an aqueous fluid into an oil external phase. The emulsifying surfactants may include nonionic, anionic, cationic, amphoteric, and zwitterionic surfactants. Suitable emulsifying surfactants may include but are not limited to, fatty amines, ethoxylated nonylphenols, fatty acids, fatty acid esters, tall oil, oxidized tall oil, modified tall oil, rosin acid, resin acid, and combinations thereof. In an embodiment, the emulsifying surfactant may be present in the oil-based drilling fluid in an amount of about 2 lb/bbl (6 kg/m$^3$) to about 24 lb/bbl (68 kg/m$^3$), or about 4 lb/bbl (11 kg/m$^3$) to about 20 lb/bbl (57 kg/m$^3$), or about 6 lb/bbl (17 kg/m$^3$) to about 16 lb/bbl (46 kg/m$^3$). In an embodiment, the emulsifying surfactant used may be determined based on the hydrophilic-lipophilic balance "HLB" value of the emulsifying surfactant.

The hydrophilic-lipophilic balance ("HLB") of an emulsifying surfactant is a measure of the degree to which it is hydrophilic or lipophilic, determined by calculating a value based on the chemical groups of the molecule. This method is also referred to as the Davies HLB value. The advantage of this method is that it takes into account the effect of stronger and weaker hydrophilic groups. The method works as follows: HLB=7+m*Hh−n*Hl where m is the number of hydrophilic groups in the molecule, Hh is the respective group HLB value of the hydrophilic groups, n is the number of lipophilic groups in the molecule, and Hl is the respective HLB value of the lipophilic groups.

The HLB model can be used for applications including emulsification, detergency, solubilization, and other applications. Typically, a HLB value will indicate the emulsifying surfactant properties, where a value of 1 to 3 indicates anti-foaming of aqueous systems, a value of 3 to 7 indicates water in oil emulsification, a value of 7 to 9 indicates wetting, a value of 8 to 28 indicates oil in water emulsification, a value of 11 to 18 indicates solubilization, and a value of 12 to 15 indicates detergency and cleaning. In an embodiment, the emulsifying surfactant used may have an HLB value of about 8 to about 28.

Additionally, a wide variety of optional additives may be included in the oil-based treatment fluid as should be appreciated by those of ordinary skill in the art with the benefit of this disclosure. Suitable additives may include, but are not limited to, a surfactant (e.g., emulsifier, foamer, defoamer, wetting agent, detergent, lubricant, and corrosion inhibitor), a water softener (e.g., sodium carbonate), an oxygen scavenger, a biocide, pH adjusters, fluid loss control agents, viscosity increasing agents, weighting agents (other than salt), a corrosion inhibitor (other than surfactant), shale stabilizer, anti-scaling additives, hydrate inhibitors, the like, and/or any combination thereof. Optional additives may be added to the oil-based treatment fluid in any suitable amount as desired for a particular application.

As previously described, the disclosed oil-based treatment fluids may be used in any of a variety of suitable applications, including, but not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations. Examples of suitable methods may include providing an oil-based treatment fluid including an aqueous internal phase and an oil external phase. The aqueous internal phase may include a bromide brine and a true crystallization temperature reduction additive. In some examples, the aqueous internal phase may include calcium bromide and calcium nitrate. The methods may further include introducing the oil-based treatment fluid into a wellbore.

In some examples, the oil-based treatment fluid may be used as a completion fluid. A completion fluid may be used, for example, to minimize damage to the hydrocarbon-containing reservoir when completing the well. In some embodiments, the completion fluid may be solids free. The completion fluid may be placed into the wellbore after drilling, for example, when transitioning to completion of the wellbore. By way of example, the completion fluid may displace the drilling fluid from the wellbore. In some embodiments, the completion fluid may be placed into the production tubing to displace drilling fluid from the production tubing such that the drilling fluid return to the surface through the annulus between the production tubing and casing. The completion fluid may be placed into the wellbore prior to initiation of production, for example, to minimize reservoir damage and control formation pressure. The completion fluid may be placed into the wellbore and allowed to remain in the wellbore during completion. For example, the completion fluid may be present in the wellbore when production equipment, such as production liners, downhole valves, and packers, placed into the wellbore in the completion fluid.

FIG. 1 illustrates an example of a downhole completion system 100 operating from a platform 102. Platform 102 may be centered over a subterranean formation 104 located below the surface 106. A conduit 108 may extend from deck 110 of platform 102 to wellhead installation 112 that includes blow-out preventers 114. Platform 102 may have a hoisting apparatus 116 and a derrick 118 for raising and lowering pipe strings, such as, for example, work string 120 into and out of wellbore 122. Wellbore 122 may extend through the various earth strata including subterranean formation 104. Work string 120, may be any suitable conveyance, including but not limited to, a tubing string, wireline, slick line, coil tubing, the like, and/or any combination thereof. A casing 124 may be cemented within wellbore 122 by cement 126. At a desired time, oil-based treatment fluid 128 may be introduced in wellbore 122 and may aid in the completion of a well. In some embodiments, oil-based treatment fluid 128 may be introduced into wellbore 122 through work string 120. Oil-based treatment fluid 128 may be any suitable treatment fluid disclosed herein. Any suitable well completion operation may be performed on wellbore 122, including but not limited to, casing, cementing, perforating, gravel packing, packers, fracturing, the like, and/or any combination thereof. It should be noted that treatment fluid 128 may be used in any suitable well completion application and should not be limited to the applications herein. In a non-limiting embodiment, oil-based treatment fluid 128 may be disposed in well bore when one or more downhole tool (e.g., production equipment) are run into wellbore 122. In some embodiments, work string 120 may be in the form a production tubing with oil-based treatment fluid 128 placed into work string 120 to replace a drilling fluid (or another fluid) previously disposed in production tubing. It should be noted that while FIG. 1 generally depicts a subsea operation, those skilled in the art will readily recognize that the principles described herein are equally applicable to land-based systems, without departing from the scope of the disclosure.

Another example method may include a method of drilling a wellbore into a subterranean formation. A drilling method may include circulating an oil-based treatment fluid (e.g., a drilling fluid) in a wellbore. The circulating may include circulating the oil-based treatment fluid through a drill string and bottom hole assembly. The oil-based treatment fluid may include an aqueous internal phase and an oil external phase. The aqueous internal phase may include a brine and a crystallization temperature reduction additive. In some examples, the aqueous internal phase may include calcium bromide and calcium nitrate. The oil-based treatment fluid may transfer kinetic energy into a mud motor to drive a drill bit on the end of the bottom hole assembly thereby extending the wellbore. In some embodiments, the wellbore may be extended through a reservoir section of the subterranean formation, and the oil-based treatment fluid may be considered a drill-in fluid.

Figure 2:
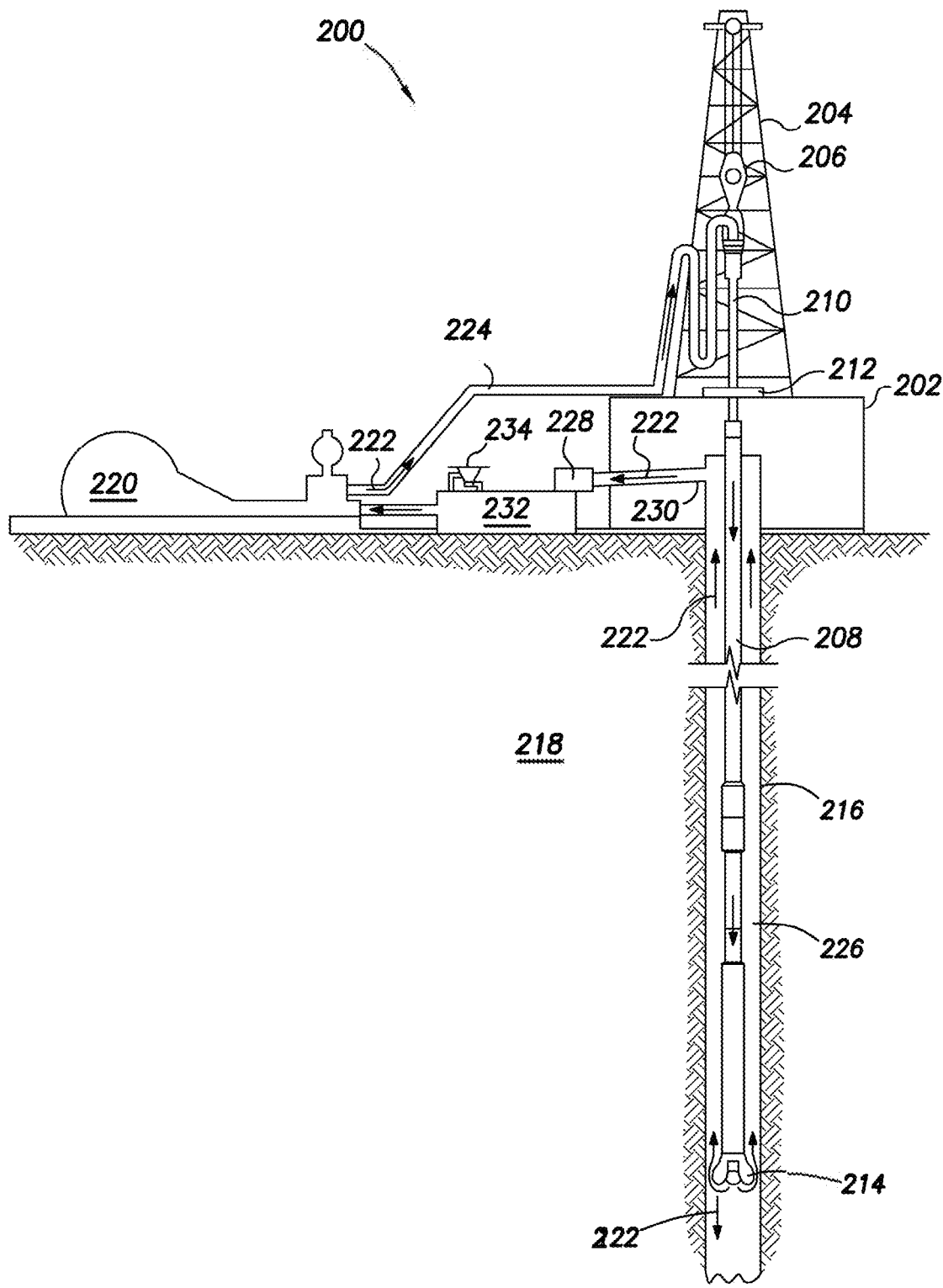
FIG. 2 illustrates a drilling system that may use an oil-based drilling fluid, wherein the oil-based drilling fluid includes a true crystallization temperature reduction additive in the aqueous internal phase.

FIG. 2 illustrates a drilling assembly 200 in which a drilling fluid 222 as disclosed above may be used. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 202 that supports a derrick 204 having a traveling block 206 for raising and lowering a drill string 208. The drill string 208 may include, but is not limited to, drill pipe and coiled tubing, as generally known to those skilled in the art. A kelly 210 may support the drill string 208 as it is lowered through a rotary table 212. A drill bit 214 may be attached to the distal end of the drill string 208 and may be driven either by a downhole motor and/or via rotation of the drill string 208 from the well surface. The drill bit 214 may include, but is not limited to, roller cone bits, PDC bits, natural diamond bits, any hole openers, reamers, coring bits, etc. As the drill bit 214 rotates, it may create a wellbore 216 that penetrates various subterranean formations 218.

Drilling fluid 222 including an aqueous internal phase, which may include a bromide brine and a true crystallization temperature reduction additive, and an oil external phase that includes a base oil, may be prepared. Additionally, drilling fluid 222 may further include additional additives, such as those described in the preceding sections. A pump 220 (e.g., a mud pump) may circulate drill-in fluid 222 through a feed pipe 224 and to the kelly 210, which conveys the drilling fluid 222 downhole through the interior of the drill string 208 and through one or more orifices in the drill bit 214 and into subterranean formation 218. The drilling fluid 222 then be circulated back to the surface via an annulus 226 defined between the drill string 208 and the walls of the wellbore 216. At the surface, the recirculated or spent drilling fluid 222 may exit the annulus 226 and may be conveyed to one or more fluid processing unit(s) 228 via an interconnecting flow line 230. The fluid processing unit(s) 228 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 228 may further include one or more sensors, gauges, pumps, compressors, and the like used store, monitor, regulate, and/or recondition the drilling fluid.

After passing through the fluid processing unit(s) 228, a "cleaned" drilling fluid 222 may be deposited into a nearby retention pit 232 (i.e., a mud pit). While illustrated as being arranged at the outlet of the wellbore 216 via the annulus 226, those skilled in the art will readily appreciate that the fluid processing unit(s) 228 may be arranged at any other location in the drilling assembly 100 to facilitate its proper function, without departing from the scope of the scope of the disclosure. One or more of the drilling fluid additives may be added to the drilling fluid 222 via a mixing hopper 234 communicably coupled to or otherwise in fluid communication with the retention pit 232. The mixing hopper 234 may include, but is not limited to, mixers and related mixing equipment known to those skilled in the art. Alternatively, the drilling fluid additives may be added to the drilling fluid 222 at any other location in the drilling assembly 200. While FIG. 1 shows only a single retention pit 232, there could be more than one retention pit 232, such as multiple retention pits 232 in series. Moreover, the retention pit 232 may be representative of one or more fluid storage facilities and/or units where the drilling fluid additives may be stored, reconditioned, and/or regulated until added to the drilling fluid 222.

Accordingly, this disclosure describes compositions and methods that may use the disclosed oil-based fluids having a true crystallization temperature reduction additive in the aqueous internal phase. The methods, systems, and apparatuses may include any of the following statements:

Statement 1. An example method may include providing an oil-based treatment fluid in the form of an invert emulsion including an aqueous internal phase and an oil external phase. The aqueous internal phase may include a bromide brine and a true crystallization temperature reduction additive, wherein the bromide brine has a density of about 14.2 lbs/gal or greater. The method may further include placing the oil-based treatment fluid into a wellbore.

Statement 2. The method of statement 1, further including circulating the oil-based treatment fluid in the wellbore while extending the wellbore into a subterranean formation with a drill bit.

Statement 3. The method of statement 1 or statement 2, further including running a downhole tool into the treatment fluid in the wellbore.

Statement 4. The method of any preceding statement, further including replacing a drilling fluid disposed in a production tubing disposed in the wellbore with the treatment fluid.

Statement 5. The method of any preceding statement, wherein the bromide brine includes at least one brine selected from the group consisting of a lithium bromide, sodium bromide, potassium bromide, rubidium bromide, magnesium bromide, calcium bromide, strontium bromide, zinc bromide, manganese (II) bromide, a manganese (II) brine, and any combination thereof.

Statement 6. The method of any preceding statement, wherein the oil external phase includes at least one base oil selected from the group consisting of a mineral oil, diesel oil, a glycol ether solvent, a hydrotreated light petroleum distillate having about 9 to 16 carbon atoms, an ethylene glycol monobutyl ether, an diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, and combinations thereof Statement 7. The method of any preceding statement, wherein the invert emulsion has an oil external phase to aqueous internal phase ratio of about 10:90 to about 99:1.

Statement 8. The method of any preceding statement, wherein the true crystallization temperature reduction additive includes at least one additive selected from the group consisting of lithium nitrate, sodium nitrate, magnesium nitrate, calcium nitrate, ammonium nitrate, strontium nitrate, a glycol, a polyol, a sugar alcohol, a sugar acid, an aldoses, a ketose, malonamide and any combination thereof.

Statement 9. The method of any preceding statement, wherein the aqueous internal phase further includes a polyol.

Statement 10. The method of any preceding statement, wherein the oil-based treatment fluid is free or essentially free of zinc and cesium formate.

Statement 11. The method of any preceding statement, wherein true crystallization temperature reduction additive includes a nitrate in an amount of about 1 wt. % to about 70 wt. % based on a total weight of the oil-based treatment fluid.

Statement 12. The method of statement 1, wherein the bromide brine includes calcium bromide brine, wherein the true crystallization temperature reduction additive includes calcium nitrate, wherein the true crystallization temperature reduction additive is present in the aqueous internal phase in an amount of about 2 wt. % to about 40 wt. % based on a total weight of the aqueous internal phase, wherein the invert emulsion has an oil external phase to aqueous internal phase ratio of about 70:30 to about 20:40, wherein the bromide brine has a first true crystallization temperature without inclusion of the true crystallization temperature reduction additive, and wherein the bromide brine has a second true crystallization temperature with true crystallization temperature reduction additive that is lower than the first true crystallization temperature.

Statement 13. An oil-based treatment fluid for use in subterranean operations, the oil-based treatment fluid including an invert emulsion. The invert emulsion may include an aqueous internal phase and an oil external phase, wherein the aqueous internal phase includes a bromide brine and a true crystallization temperature reduction additive. The bromide brine may have a density of about 14.2 lbs/gal or greater. The bromide brine may have a first true crystallization temperature without inclusion of the true crystallization temperature reduction additive. The bromide brine may have a second true crystallization temperature with the true crystallization temperature reduction additive that is lower than the first true crystallization temperature reduction additive.

Statement 14. The oil-based treatment fluid of statement 13, wherein the second true crystallization temperature is less than the first true crystallization temperature by about 9° F. or more.

Statement 15. The oil-based treatment fluid of statement 13 or statement 14, wherein the bromide brine includes at least one brine selected from the group consisting of a lithium bromide, sodium bromide, potassium bromide, rubidium bromide, magnesium bromide, calcium bromide, strontium bromide, zinc bromide, manganese (II) bromide, a manganese (II) brine, and any combination thereof, and wherein the oil external phase includes at least one base oil selected from the group consisting of a mineral oil, diesel oil, a glycol ether solvent, a hydrotreated light petroleum distillate having about 9 to 16 carbon atoms, an ethylene glycol monobutyl ether, an diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, and combinations thereof Statement 16. The oil-based treatment fluid of any one of statements 13 to 15, wherein the invert emulsion has an oil external phase to aqueous internal phase ratio of about 10:90 to about 99:1.

Statement 17. The oil-based treatment fluid of any one of statements 13 to 16, wherein the true crystallization temperature reduction additive includes at least one additive selected from the group consisting of lithium nitrate, sodium nitrate, magnesium nitrate, calcium nitrate, ammonium nitrate, strontium nitrate, a glycol, a polyol, a sugar alcohol, a sugar acid, an aldoses, a ketose, malonamide and any combination thereof.

Statement 18. The oil-based treatment fluid of any one of statements 13 to 17, wherein aqueous internal phase further includes a polyol.

Statement 19. The oil-based treatment fluid of any one of statements 13 to 18, wherein the oil-based treatment fluid is free or essentially free of zinc and cesium formate.

Statement 20. The oil-based treatment fluid of any one of statements 13 to 19, wherein true crystallization temperature reduction additive includes a nitrate in an amount of about 1 wt. % to about 70 wt. % based on a total weight of the oil-based treatment fluid.

To facilitate a better understanding of the present technique, the following examples of some specific embodiments are given. In no way should the following examples be read to limit, or to define, the scope of the disclosure.

Examples

Oil-based treatment fluids were prepared that included a true temperature true crystallization temperature reduction additive in a high density brine. In particular, the oil-based treatment fluid included an aqueous internal phase. The aqueous internal phase included a high density brine having a density of 14.8 lbs/gal (1,770 kg/m$^3$). The high density brine was a mixture of calcium bromide and a true crystallization temperature reduction additive. The true crystallization temperature reduction additive was calcium nitrate. The calcium nitrate was included in an amount of 15.7 wt. % based on a total weight of the high density brine. The oil external phase included a synthetic base fluid as the base oil. The oil-based treatment fluids further included two different invert emulsifiers, Emulsifier A (amidoamine) and Emulsifier B (alkoxylated alcohol). The oil-based treatment fluids also included lime, a fluid loss additive, a filtration control agent (acrylic co-polymer), an organophilic clay viscosifier, and a calcium carbonate bridging agent having a median particle size (d50) of 5 microns.

For this Example, four sample oil-based treatment fluids were prepared that are identified as Samples 1-4. The formulations for each Sample are provided in the table below.

TABLE 1

| Sample Number | 1 | 2 | 3 | 4 |
| --- | --- | --- | --- | --- |
| Flued Density | 12.1 lb/gal (1450 kg/m$^3$) | 12.1 lb/gal (1450 kg/m$^3$) | 12.5 lb/gal (1500 kg/m$^3$) | 12.5 lb/gal (1500 kg/m$^3$) |
| Oil-Water Ratio | 51/49 | 50/50 | 48/52 | 45/55 |
| Synthetic Base Oil, bbl (m$^3$) | 0.324 (0.0515) | 0.322 (0.0512) | 0.291 (0.0463) | 0.275 (0.0437) |
| Emulsifier A, lb (kg) | 6 (2.72) | 6 (2.72) | 6 (2.72) | 6 (2.72) |
| Emulsifier B, lb (kg) | 14 (6.35) | 14 (6.35) | 14 (6.35) | 14 (6.35) |
| Lime, lb (kg) | 2.8 (1.27) | 2.8 (1.27) | 2.8 (1.27) | 2.8 (1.27) |
| High density brine (14.8 lb/gal), bbl (m$^3$) | 0.556 (0.0884) | 0.588 (0.0935) | 0.586 (0.0932) | 0.63 (0.100) |
| Filtration Control Additive, lb (kg) | 2 (0.907) | — | 2 (0.907) | — |
| Viscosifier, lb (kg) | 1 (0.453) | 1 (0.453) | 1 (0.453) | 1 (0.453) |
| Bridging Agent, lb (kg) | 48 (21.77) | 25 (11.34) | 50 (22.68) | 28 (12.70) |

As illustrated in the table above, the oi-water ratio of each Sample was changed. After preparation, the Samples underwent rheological testing in accordance with "Recommended Practice for Field Testing of Oil-Based Drilling Fluids", API Recommended Practice 13B-1, Fourth Edition, March 2005. The results of the rheological testing are provided in the following tables.

TABLE 2

| | Sample | | | | | |
|---|---|---|---|---|---|---|
| | #1 | | | #2 | | |
| | Aging condition (248° F. (120° C.)) | | | | | |
| | 0 | HR-4 hr | SA-16 hr | 0 | HR-4 hr | SA-16 hr |
| | | | Testing temperature 120° F. (49° C.) | | | |
| 600 rpm | 195 | 207 | 220 | 147 | 118 | 122 |
| 300 rpm | 112 | 120 | 129 | 83 | 67 | 69 |
| 200 rpm | 85 | 87 | 94 | 60 | 49 | 50 |
| 100 rpm | 47 | 52 | 56 | 33 | 27 | 28 |
| 6 rpm | 7 | 10 | 11 | 5 | 5 | 5 |
| 3 rpm | 5 | 7 | 8 | 4 | 3 | 3 |
| Plastic viscosity, cP | 83 | 87 | 91 | 64 | 51 | 53 |
| Yield point, lb/100 ft$^2$ (kPa) | 29 (139) | 33 (158) | 38 (182) | 19 (91) | 16 (76) | 16 (76) |
| 10 Sec gel, lb/100 ft$^2$ (kPa) | 6 (29) | 8 (38) | 9 (43) | 4 (19) | 5 (24) | 5 (24) |
| 10 min gel, lb/100 ft$^2$ (kPa) | 5 (24) | 7 (34) | 8 (38* | 4 (19) | 4 (19) | 4 (19) |
| Electrical stability, V | 259 | 525 | 490 | 228 | 428 | 348 |
| Top Oil, mL | — | — | 0 | — | — | 0 |
| Bottom Mud Density, lb/gal (kg/m$^3$) | — | — | 12.1 (1450) | — | — | 12.0 (1438) |
| Top Mud Density, lb/gal (kg/m$^3$) | — | — | 12.1 (1450) | — | — | 12.0 (1438) |
| Sag Factor | — | — | 0.50 | — | — | 0.50 |

TABLE 3

| | Sample | | | | | |
|---|---|---|---|---|---|---|
| | #3 | | | #4 | | |
| | Aging condition (248° F. (120° C.)) | | | | | |
| | 0 | HR-4 hr | SA-16 hr | 0 | HR-4 hr | SA-16 hr |
| | | | Testing temperature 120° F. (49° C.) | | | |
| 600 rpm | 234 | 265 | 290 | 190 | 165 | 180 |
| 300 rpm | 139 | 160 | 174 | 109 | 98 | 105 |
| 200 rpm | 100 | 118 | 128 | 77 | 70 | 76 |
| 100 rpm | 600 | 72 | 81 | 44 | 42 | 45 |
| 6 rpm | 11 | 15 | 16 | 8 | 8 | 9 |
| 3 rpm | 7 | 11 | 11 | 5 | 6 | 7 |
| Plastic viscosity, cP | 95 | 105 | 116 | 81 | 67 | 75 |
| Yield point, lb/100 ft$^2$ (kPa) | 44 (211) | 55 (263) | 58 (278) | 28 (134) | 31 (148) | 30 (144) |
| 10 Sec gel, lb/100 ft$^2$ (kPa) | 8 (38) | 12 (57) | 12 (57) | 7 (34) | 7 (34) | 7 (34) |
| 10 min gel, lb/100 ft$^2$ (kPa) | 5 (24 | 8 (38) | 1 (53)1 | 5 (24) | 6 (29) | 7 (34) |

TABLE 3-continued

| | Sample | | | | | |
|---|---|---|---|---|---|---|
| | #3 | | | #4 | | |
| | Aging condition (248° F. (120° C.)) | | | | | |
| | 0 | HR-4 hr | SA-16 hr | 0 | HR-4 hr | SA-16 hr |
| | | | Testing temperature 120° F. (49° C.) | | | |
| Electrical stability, V | 400 | 569 | 450 | 257 | 480 | 414 |
| Top Oil, mL | — | — | 0 | — | — | 0 |
| Bottom Mud Density, lb/gal (kg/m$^3$) | — | — | 12.3 (1474) | — | — | 12.4 (1486) |
| Top Mud Density, lb/gal (kg/m$^3$) | — | — | 12.3 (1474) | — | — | 12.4 (1486) |
| Sag Factor | — | — | 0.50 | — | — | 0.50 |

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below.

Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. An oil-based treatment fluid for use in subterranean operations, the oil-based treatment fluid comprising:
   an invert emulsion comprising an aqueous internal phase and an oil external phase,
   wherein the aqueous internal phase is solids free and comprises a two-salt brine and a true crystallization temperature reduction additive,
   wherein the true crystallization temperature reduction additive comprises a sugar alcohol, a sugar acid, or any combination thereof,
   wherein the two-salt brine comprises a bromide and a nitrate,
   wherein no additional salts are in the aqueous internal phase,
   wherein the two-salt brine has a density of about 14.2 lbs/gal to about 17 lbs/gal;
   wherein the two-salt brine has a first true crystallization temperature without inclusion of the true crystallization temperature reduction additive; and
   wherein the two-salt brine has a second true crystallization temperature with the true crystallization temperature reduction additive that is lower than the first true crystallization temperature.

2. The oil-based treatment fluid of claim 1, wherein the second true crystallization temperature is less than the first true crystallization temperature by about 5° F. to about 55° F.

3. The oil-based treatment fluid of claim 1, wherein the second true crystallization temperature is less than the first true crystallization temperature by about 9° F. to about 55° F.

4. The oil-based treatment fluid of claim 1, wherein the second true crystallization temperature is less than the first true crystallization temperature by about 55° F.

5. The oil-based treatment fluid of claim 1, wherein the bromide comprises at least one bromide selected from the group consisting of a lithium bromide, sodium bromide, potassium bromide, rubidium bromide, magnesium bromide, calcium bromide, strontium bromide, zinc bromide, manganese (II) bromide, and any combination thereof, and wherein the oil external phase comprises at least one base oil selected from the group consisting of a mineral oil, diesel oil, a glycol ether solvent, a hydrotreated light petroleum distillate having about 9 to 16 carbon atoms, an ethylene glycol monobutyl ether, an diethylene glycol monobutyl ether, an alkane, an aromatic organic compound, a cyclic alkane, a paraffin, desulfurized hydrogenated kerosene, a polyolefin, a polydiorganosiloxane, a siloxane, an ester, and combinations thereof.

6. The oil-based treatment fluid of claim 1, wherein the invert emulsion has an oil external phase to aqueous internal phase ratio of about 10:90 to about 99:1.

7. The oil-based treatment fluid of claim 1, wherein the true crystallization temperature reduction additive further comprises at least one additive selected from the group consisting of a glycol, a polyol, an aldoses, a ketose, malonamide and any combination thereof.

8. The oil-based treatment fluid of claim 1, wherein the aqueous internal phase further comprises a polyol.

9. The oil-based treatment fluid of claim 1, wherein the oil-based treatment fluid is free of zinc formate and cesium formate.

10. The oil-based treatment fluid of claim 1, wherein the nitrate is present in an amount of about 1 wt. % to about 70 wt. % based on a total weight of the oil-based treatment fluid.

11. The oil-based treatment fluid of claim 1, wherein the nitrate is present in an amount of about 5 wt. % to about 50 wt. % based on a total weight of the aqueous internal phase.

12. The oil-based treatment fluid of claim 1, wherein the nitrate is present in an amount of about 10 wt. % to about 40 wt. % based on a total weight of the aqueous internal phase.

13. The oil-based treatment fluid of claim 1, wherein the nitrate is present in an amount of about 1 wt. % to about 20 wt. % based on a total weight of the aqueous internal phase.

14. The oil-based treatment fluid of claim 1, wherein the two-salt brine has a density of about 14.2 lbs/gal to about 15 lbs/gal.

15. An oil-based treatment fluid for use in subterranean operations, the oil-based treatment fluid comprising:
an invert emulsion comprising an aqueous internal phase and an oil external phase,
wherein the aqueous internal phase is solids free and comprises a two-salt brine of a bromide and a nitrate,
wherein the aqueous internal phase comprises a sugar alcohol, a sugar acid, or any combination thereof,
wherein the nitrate is selected from the group consisting of lithium nitrate, sodium nitrate, magnesium nitrate, calcium nitrate, ammonium nitrate, strontium nitrate, and combinations thereof,
wherein no additional salts are in the aqueous internal phase, and
wherein the aqueous brine internal phase has a density from about 14.2 lbs/gal to 17 lbs/gal.

16. The oil-based treatment fluid of claim 15, wherein the bromide comprises at least one bromide selected from the group consisting of lithium bromide, sodium bromide, potassium bromide, rubidium bromide, magnesium bromide, calcium bromide, strontium bromide, zinc bromide, manganese (II) bromide, and any combination thereof.

17. The oil-based treatment fluid of claim 15, wherein the nitrate comprises the calcium nitrate.

18. The oil-based treatment fluid of claim 17, wherein the nitrate is present in an amount of about 1 wt. % to about 70 wt. % based on a total weight of the aqueous internal phase.

19. The oil-based treatment of claim 15, wherein the bromide comprises a calcium bromide in an amount of about 80 wt. % to 99 wt. % based on a total weight of the aqueous internal phase.

20. The oil-based treatment of claim 15, wherein the invert emulsion has an oil external phase to aqueous internal phase ratio of about 70:30 to about 30:70.

* * * * *